June 28, 1955 H. P. HAGEN 2,711,800
WHEEL BRAKE FOR FLOATING HUB WHEELS
Filed July 10, 1952 2 Sheets-Sheet 1
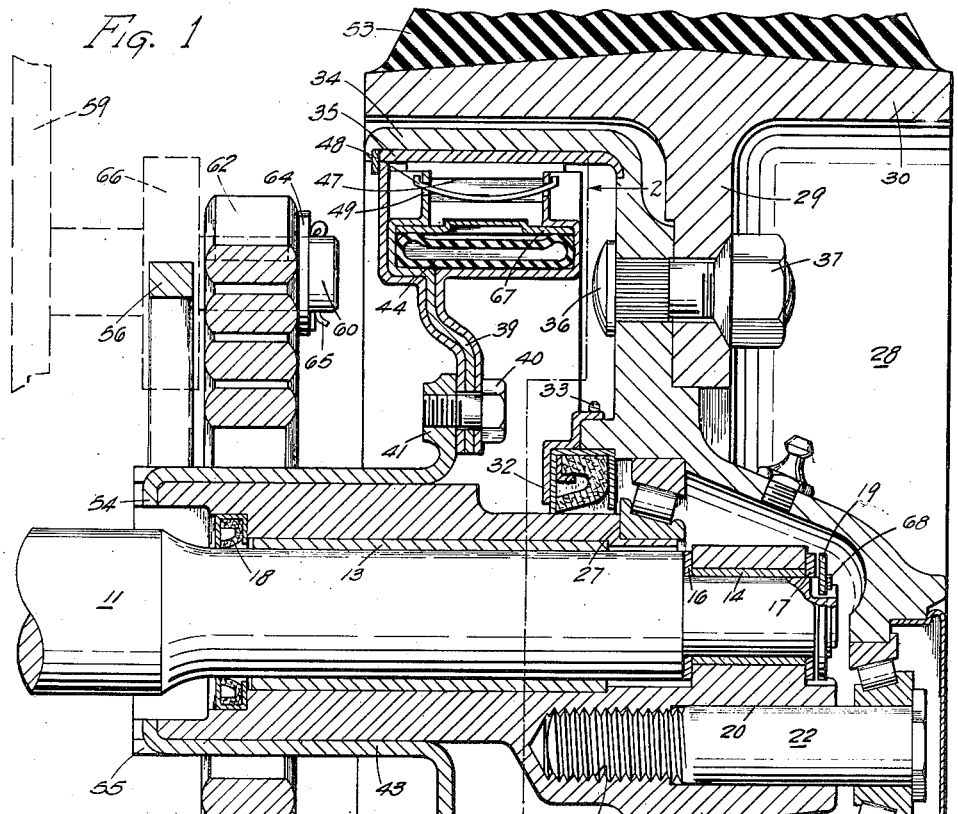
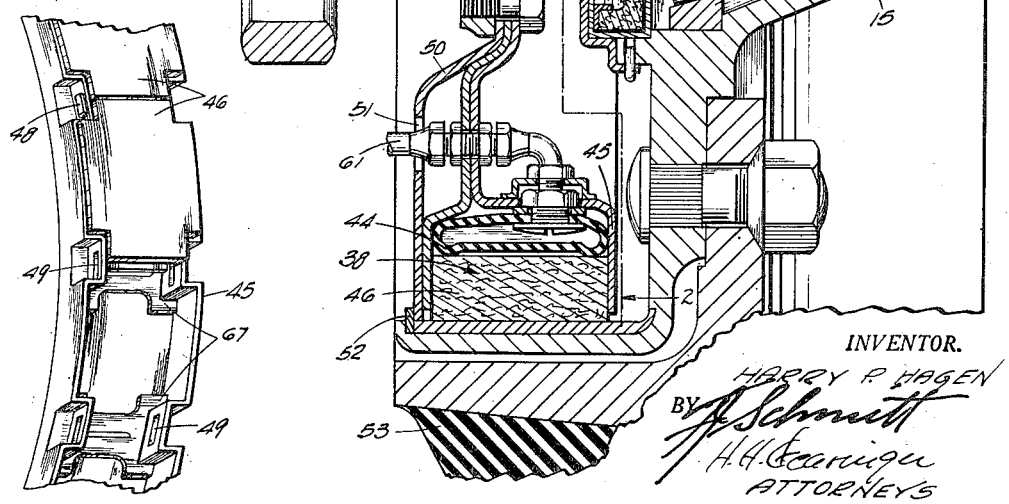
INVENTOR.
HARRY P. HAGEN
BY
ATTORNEYS June 28, 1955 H. P. HAGEN 2,711,800
WHEEL BRAKE FOR FLOATING HUB WHEELS
Filed July 10, 1952 2 Sheets-Sheet 2

INVENTOR.
HARRY P. HAGEN
BY
ATTORNEYS

United States Patent Office 2,711,800
Patented June 28, 1955

2,711,800

WHEEL BRAKE FOR FLOATING HUB WHEELS

Harry P. Hagen, Springfield, Pa.

Application July 10, 1952, Serial No. 298,217

4 Claims. (Cl. 188—18)

(Granted under Title 35, U. S. Code (1952), sec. 266)

The invention described herein may be manufactured and used by or for the Government of the United States of America for governmental purposes without the payment of any royalties thereon or therefor.

This invention relates to new and useful improvements in brakes for vehicle wheels. More specifically, it is the purpose of this invention to provide an internal expanding type of brake for use on a vehicle wheel known in the art as a "floating hub" wheel.

This type of wheel differs from the ordinary vehicle wheel in that the center of the wheel and its axis of rotation are eccentric to the centerline of the load carrying axle. This construction permits the wheel to "climb" over obstructions and drop into and "climb" out of holes by swivelling on the load carrying axle, thus maintaining the vehicle on an even keel with a minimum of jolts. This feature makes the wheel particularly adaptable for carrying fragile or other materials where impact shock would be dangerous or detrimental. However, because of the relative eccentric motion between the wheel and any stationary part of the vehicle to which the wheel is affixed, the problem of providing an efficient braking system for such a vehicle has been extremely difficult.

Prior to this invention a friction or drag shoe was applied to the tire of the wheel. This, of course, caused unnecessary wear of the tire, the braking pressure applied varied with the position of the wheel relative to the eccentric axis and the braking system was generally very inefficient as compared to an internal expanding type of brake.

Since vehicles with "floating hub" wheels were used, for example, as rearming vehicles in such locations as on aircraft carrier deck where space is limited and the loads carried of such magnitude that the vehicle could not be quickly stopped by manual means, the old type of braking system was grossly inadequate. By making it possible to utilize a hydraulic internal expanding type brake with a "floating hub" wheel, this invention has eliminated the difficulties in braking which were considered as an insurmountable disadvantage incident to the employment of a "floating hub" wheel. In addition it makes possible a smoother, cleaner appearing wheel and brake assembly.

It is an object of this invention to provide structure whereby an internal expanding type brake may be applied to a "floating hub" wheel.

It is a further object of this invention to permit improved design and appearance of a "floating hub" wheel and brake assembly.

Still another object of the invention is to teach the modification of a "floating hub" wheel such that an internal expanding type brake, for example, an expander tube brake, may be attached to the wheel.

Other objects and many of the attendant advantages of this invention will be readily appreciated as the same becomes better understood by reference to the following detailed description when considered in connection with the accompanying drawings wherein:

Fig. 1 is a cross sectional view of the wheel and brake assembly taken on line 1—1 of Fig. 3.

Fig. 4 is a fragmentary perspective view of a portion of the brake clarifying the relation of the shields and blocks and the brake frame.

Figure 3:
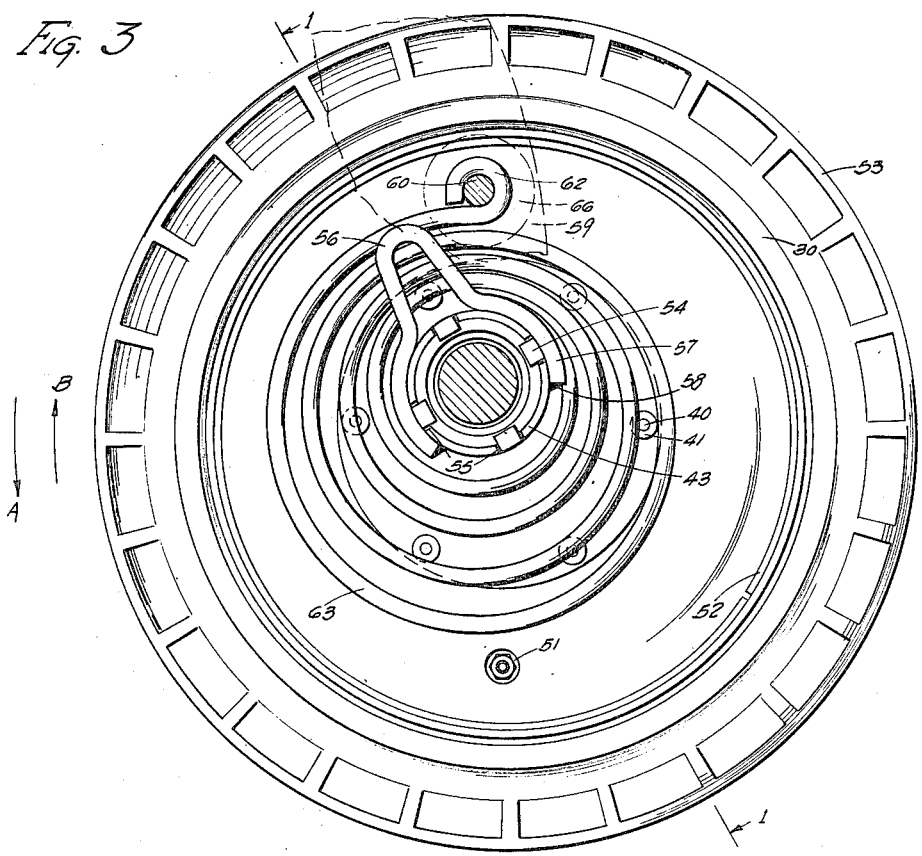
Fig. 3 is a side elevation of the assembly looking at the brake side.
Figure 2:
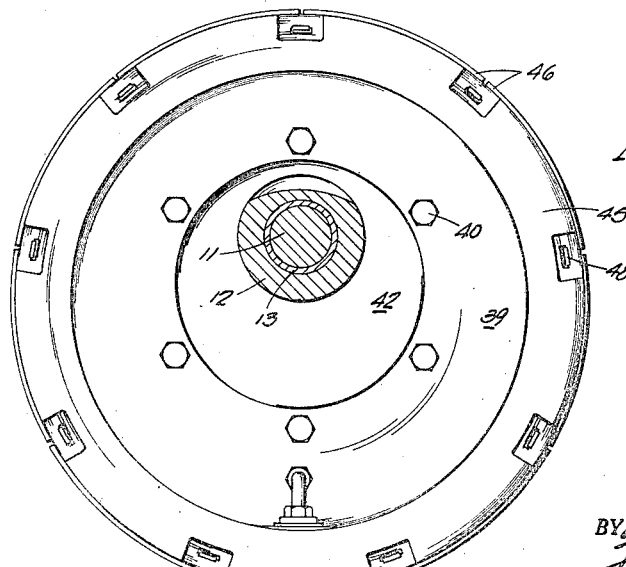
Fig. 2 is a sectional view of the brake assembly taken on line 2—2 of Fig. 1.

Referring more specifically to Fig. 1, the numeral 11 designates a load carrying axle which supports a mounting hub 12 swivelled on bearings 13 and 14. Thrust collars or washers 16 and 17, oil seal ring 18, washer 19 and locking ring 68 complete this portion of the assembly. Wheel hub 15 is mounted on bearing assemblies 23, 24 which are retained by annular shoulders 26 and 27. Bolt 22 which fastens the wheel hub to the mounting hub engages threads 21 which are provided for a portion of the length of a bore 20 formed in the hub 12. The bolt 22 also serves as a stub shaft for supporting the bearing 23.

A hub cap 31 is fixed at one end of the wheel hub and an oil seal ring 25 closes the space between mounting hub 12 and wheel hub 15 at the other end of the wheel hub. A demountable wheel 28 having a disk 29 and a rim 30 is bolted onto the wheel hub by means of bolts 36 and nuts 37 and carries a tire 53. A cover plate 32 secured by locking ring 33 protects and secures the oil seal ring 25.

A brake drum 34, preferably formed with a hardened facing 35, is rigidly attached to the wheel disk or made integral therewith. The brake mechanism 38 is supported on the circumference of a disk or brake frame 39 which is in turn fastened by the bolts 40 which engage threaded bosses 41 in a flange 42 carried by a cup-shaped member 43. The disk or brake frame is made with an eccentrically disposed circular opening of a diameter larger than the greatest diameter of the mounting hub 12 to permit assembly and disassembly and flange 42 is complementary to the eccentric opening in the disk so that the outer periphery of the brake mechanism is concentric with the wheel and brake drum. The brake mechanism consists of an annular hollow tube 44 of rubber or other deformable non-porous material connected to a source of hydraulic pressure and retained within an annular flange 45 which is part of the brake frame 39. Arranged around the periphery of the tube are arcuate brake shoes or blocks 46 provided at each end with cross-bores 47 and guided by the annular flange 45. A retractor spring 48 is loosely fitted through each of the cross-bores and has its ends confined in openings 49 suitably placed in the flange 45 of the brake frame. Shields 67 are placed between the brake blocks and the tube 44 overlying the space between adjacent brake blocks to prevent damage to the tube which might be caused by pinching between adjacent brake blocks.

The brake mechanism is protected against dirt and moisture by a cover plate 50 which is carried by the flange 42. A bore 51 is formed in the place through which passes a hydraulic pressure supply line 61. The outer edge of the cover plate is brought up close to the brake drum and overlaps a resilient hoop or snap ring 52 carried by the drum.

Referring now to Fig. 3, a spiral spring 63 which is part of the "floating hub" wheel suspension is welded or otherwise attached at one end to the cup-shaped member 43 which is in turn rigidly secured to hub 12 by press fitting or the like, the inturned ears or lugs 54 cooperating with notches 55 providing additional resistance to relative rotation between the hub and the cup. The other end of spring 63 is looped as shown at 62 about a cylindrical rod or shaft 60 which is rigidly carried by the vehicle indicated at 59. A washer 64 on the rod retains the loop and is itself held in place by a cotter pin 65 which is fitted into a drilled hole adjacent the free end of the shaft.

A stop member 66 is also carried on the shaft 60 and cooperates with a bumper 56 rigidly secured through arms 57 to the outside of the cup-shaped member 43 by welding or the like, as at 58.

It can be seen that regardless of the position of the wheel center with respect to the axle center, the periphery of the brake unit will always be concentric with the brake drum and wheel, because the brake unit and the wheel and drum all are fixed to the mounting hub 12 and pivot with it about the axle 11. If the brake is applied with wheel 28 rotating, the braking reaction is transmitted through the brake frame 39 to the cupped member 43 and thence to the spiral spring 63 and finally to the vehicle through the shaft 60.

With the wheel rotating in the direction represented by arrow A in Fig. 3, when the brakes are applied, there will be a tendency to "wind" the spring and the wheel will rotate about the eccentric axle 11 lowering the axle and vehicle. Due to the stiffness of spring 63 rotation of the wheel about axle 11 will be limited. But should the wheel rotate to a position wherein the wheel center and axle center are in vertical alignment with the center of axle 11 closer to the ground, it will be seen that in order for the wheel to swivel further about axle 11, it must lift the axle and vehicle. Thus, swivelling of the wheel about axle 11 is further opposed.

If the brakes are applied with the wheel rotating in the direction shown by arrow B, only limited rotation of the wheel about axle 11 will take place before bumper 56 strikes the stop member 66.

Obviously many modifications and variations of the present invention are possible in the light of the above teachings. It is, therefore, to be understood that within the scope of the appended claims the invention may be practiced otherwise than as specifically described.

What is claimed is:

1. In a braking assembly for a demountable disk wheel rotatable on a mounting hub whose center is eccentrically disposed with respect to the center of an associated load-carrying axle, a brake drum rigidly attached to the wheel and being concentric therewith, a rigid flange, a brake frame having an eccentrically disposed opening of a diameter greater than the largest diameter of said mounting hub, the brake frame being secured to the mounting hub by the rigid flange whose outer periphery is of a shape complementary to the eccentricity of the opening in the brake frame, a flat, spiral spring having one end secured to said rigid flange and having its other end fixed to a vehicle supported by said wheel and a hydraulically operated, internal, expanding brake mechanism cooperatively associated with the brake drum and being supported on the periphery of said brake frame.

2. In a brake and wheel assembly for a vehicle, a load carrying axle, a mounting hub formed by an elongated cylindrical sleeve rotatable on said axle and a cylindrical disk eccentrically encompassing a portion of the sleeve near one end thereof, a disk-wheel removably mounted on said hub concentrically with said disk, a brake drum secured to the wheel and being concentric with said disk, a brake frame having an eccentric opening therein of a diameter larger than the diameter of the disk, a brake mechanism supported on the brake frame in cooperating relation with the brake drum, said brake frame being attached to the sleeve by a flange, said flange being complementary to the eccentricity of the opening in the brake frame so that the outer periphery of said frame and brake mechanism is maintained in a position concentric with the brake drum, and resilient means connecting said sleeve to said vehicle and permitting limited relative rotation of said sleeve about said load carrying axle.

3. In a wheel and brake assembly for a vehicle, a load carrying axle, a mounting hub having a threaded central bore, a wheel hub integrally formed with a brake drum and secured to said mounting hub by means of a bolt threaded into said bore, an eccentrically disposed cylindrical sleeve integral with said mounting hub for mounting said hub on said axle and having its longitudinal axis parallel to the center of said mounting hub, a brake mechanism comprising a brake frame slidably retaining a series of arcuate brake shoes in cooperative relation to the brake drum, a flat cover plate having an outer edge substantially coinciding with the braking surface of the brake drum, a retainer ring for removably securing said cover plate to said brake drum, an eccentrically disposed opening in said cover plate coincident with an opening in said brake frame, the diameter of said opening being greater than the outside diameter of the mounting hub, a rigid flange secured to said mounting hub concentric with the openings in said brake frame and cover plate and of a larger diameter than said openings, spaced internally threaded bosses adjacent the periphery of said flange matching with holes through the brake frame and cover plate, bolts extending through said holes and securing the brake frame and cover plate to the flange and resilient means connecting said hub and said vehicle to permit limited relative rotation about the load carrying axle.

4. In a brake and wheel assembly for a vehicle, a wheel, a load carrying axle, a mounting hub having an eccentrically disposed bore by means of which said hub is swivelled on said axle, a concentric threaded bore in said hub, a stub shaft having a threaded end entering said threaded bore, a bearing on said hub, a bearing on said stub shaft cooperating with the bearing on said hub to rotatably mount the wheel concentrically with said hub, the stub shaft also serving to attach the wheel to the hub, a brake drum firmly secured to said wheel concentrically with the hub, brake mechanism of the internal, expanding type associated with said brake drum supported by means attached to the hub and a flat spiral spring having its one end attached to the hub and its other end secured to the vehicle.

References Cited in the file of this patent

UNITED STATES PATENTS

| | | |
|---|---|---|
| 1,847,125 | Masury | Mar. 1, 1932 |
| 2,004,740 | Winkler | June 11, 1935 |
| 2,377,232 | Herold | May 29, 1945 |
| 2,473,646 | Hollerith | June 21, 1949 |

FOREIGN PATENTS

| | | |
|---|---|---|
| 176,262 | Switzerland | June 17, 1931 |